US007907511B2

United States Patent
Kim et al.

(10) Patent No.: US 7,907,511 B2
(45) Date of Patent: Mar. 15, 2011

(54) APPARATUS AND METHOD OF RECONSTRUCTING AMPLITUDE-CLIPPED SIGNAL

(75) Inventors: Young-Doo Kim, Suwon-si (KR); Eung Sun Kim, Suwon-si (KR); Tae Soo Kwon, Hwaseong-si (KR); Ui Kun Kwon, Pohang-si (KR); Gi Hong Im, Pohang-si (KR); Dong Sik Kim, Pohang-si (KR)

(73) Assignees: Samsung Electronics Co., Ltd., Suwon-si (KR); Postech Academy-Industry Foundation, Pohang-si (KR)

( * ) Notice: Subject to any disclaimer, the term of this patent is extended or adjusted under 35 U.S.C. 154(b) by 513 days.

(21) Appl. No.: 11/924,928

(22) Filed: Oct. 26, 2007

(65) Prior Publication Data

US 2009/0034408 A1    Feb. 5, 2009

(30) Foreign Application Priority Data

Aug. 3, 2007    (KR) .................. 10-2007-0078057

(51) Int. Cl.
  *H04J 11/00*    (2006.01)
(52) U.S. Cl. ......... 370/208; 370/210; 370/310; 714/746; 375/345; 455/101
(58) Field of Classification Search .................. None
  See application file for complete search history.

(56) References Cited

U.S. PATENT DOCUMENTS

| 2001/0000220 | A1* | 4/2001 | Polley et al. ............... 375/285 |
| 2003/0220801 | A1* | 11/2003 | Spurrier ..................... 704/503 |
| 2004/0165524 | A1 | 8/2004 | Chen et al. .................. 370/208 |
| 2005/0185723 | A1* | 8/2005 | Anvari ........................ 375/260 |
| 2006/0078066 | A1* | 4/2006 | Yun et al. .................... 375/299 |
| 2006/0215537 | A1 | 9/2006 | Wu et al. ..................... 370/208 |
| 2006/0250936 | A1 | 11/2006 | Chen et al. .................. 370/208 |
| 2006/0262714 | A1* | 11/2006 | Tarokh et al. ............... 370/208 |
| 2007/0089015 | A1* | 4/2007 | Saul ............................ 714/746 |
| 2007/0121483 | A1* | 5/2007 | Zhang et al. ................ 370/208 |

FOREIGN PATENT DOCUMENTS

| KR | 10-2000-0007908 A | 2/2000 |
| KR | 10-2005-0102799 A | 10/2005 |
| KR | 10-2006-0031924 A | 4/2006 |
| KR | 10-2006-0066030 A | 6/2006 |
| WO | 2005/043853 A1 | 5/2005 |
| WO | 2005/076560 A1 | 8/2005 |

* cited by examiner

*Primary Examiner* — Chi H. Pham
*Assistant Examiner* — Shick Hom
(74) *Attorney, Agent, or Firm* — Sughrue Mion, PLLC

(57) ABSTRACT

A wireless data transmission method and apparatus are provided for compensating a distortion due to a clipped amplitude when an amplitude of a signal is clipped to reduce a peak to average power ratio (PAPR) in a wireless communication system using an orthogonal frequency division multiplexing (OFDM) scheme and a transmit diversity method using an orthogonal coding. The wireless data transmission apparatus includes a coding unit which Space-Time block codes a first data stream into a plurality of second data streams, the plurality of second data streams being orthogonal to each other; an inverse Fourier transform unit which performs an inverse Fourier transform of each of the Space-Time block coded second data stream and generates a plurality of time domain signals; and a plurality of amplitude clipping units which clips an amplitude of each of the plurality of generated time domain signals.

32 Claims, 9 Drawing Sheets

APPARATUS AND METHOD OF RECONSTRUCTING AMPLITUDE-CLIPPED SIGNAL

CROSS-REFERENCE TO RELATED APPLICATION

This application claims priority from Korean Patent Application No. 10-2007-078057, filed on Aug. 3, 2007, in the Korean Intellectual Property Office, the entire disclosure of which is incorporated herein by reference.

BACKGROUND OF THE INVENTION

1. Field of the Invention

Methods and apparatuses consistent with the present invention relate to a method and apparatus for compensating an amplitude clipping distortion and sequentially reconstructing a transmitted signal. More particularly, the present invention relates to a method and apparatus which Space-Time block codes or Space-Frequency block codes data, modulates the data using an orthogonal frequency division multiplexing (OFDM) scheme, receives a signal, which is amplitude-clipped and transmitted via a plurality of antennas, and thereby may sequentially reconstruct a transmitted signal from the amplitude clipping distortion.

2. Description of Related Art

In a wireless mobile communication, a wireless channel between a transmission apparatus and a receiving apparatus varies over time due to a fading phenomenon. A data transmission efficiency from a transmission apparatus to a receiving apparatus depends on a state of wireless channel. A transmission diversity method has been used to overcome a low data transmission efficiency due to a fading phenomenon.

The transmission diversity method transmits data, orthogonal to each other, using a plurality of antennas in a transmission apparatus, receives a signal using an orthogonality of signals transmitted from each of the plurality of antennas in a receiving apparatus, and thereby may maintain a data transmission efficiency even when a state of the wireless channel is deteriorated.

An orthogonal coding is used to transmit data, orthogonal to each other, using a plurality of antennas. The orthogonal coding generates a plurality of data streams, orthogonal to each other, from a single data stream, similar to a Space-Time block coding or a Space-Frequency block coding.

A multi-carrier transmission method such as an orthogonal frequency division multiplexing (OFDM) scheme or filtered multi-tone (FMT) is superior to a channel environment such as a frequency selective fading, narrowband interference, and the like. However, a power efficiency of a transmission amplifier decreases due to a high Peak-to-average power ratio (PAPR) and a nonlinear distortion of transmission signal may occur.

An amplitude clipping method from among PAPR reduction methods clips a portion of a level of an input signal, that is, the portion being greater than a reference value. The amplitude clipping method is easily and simply embodied. However, an amplitude clipping causes a distortion of transmission signal and degrades a bit-error rate (BER) of system.

Thus, a wireless data transmission apparatus and method and a wireless data receiving apparatus and method are required.

SUMMARY OF THE INVENTION

The present invention provides a wireless data transmission apparatus which modulates data using an orthogonal frequency division multiplexing (OFDM) scheme in order to overcome a fading phenomenon, transmits a signal using a transmission diversity of Space-Time block coding, and enables an orthogonality of signals transmitted from each antenna to be maintained when an amplitude of the signal is clipped to reduce a peak to average power ratio (PAPR).

Another aspect of the present invention also provides a wireless data transmission apparatus which modulates data using an OFDM scheme, transmits a signal using a transmission diversity of Space-Frequency block coding, and enables an orthogonality of signals transmitted from each antenna to be maintained when an amplitude of the signal is clipped to reduce a PAPR.

Another aspect of the present invention also provides a wireless data transmission method which demodulates data using an OFDM scheme, transmits a signal using a transmission diversity of Space-Time block coding, and enables an orthogonality of signals transmitted from each antenna to be maintained when an amplitude of the signal is clipped to reduce a PAPR.

According to an aspect of the present invention, there is provided a wireless data transmission apparatus which transmits a data stream via a plurality of antennas, the apparatus including: a coding unit which Space-Time block codes a first data stream into a plurality of second data streams, the plurality of second data streams being orthogonal to each other; an inverse Fourier transform unit which performs an inverse Fourier transform of each of the Space-Time block coded second data stream and generates a plurality of time domain signals; and a plurality of amplitude clipping units which clips an amplitude of each of the plurality of generated time domain signals.

According to an aspect of the present invention, there is provided a wireless data transmission apparatus which transmits a data stream via a plurality of antennas, the apparatus including: an inverse Fourier transform unit which performs an inverse Fourier transform of even numbered elements and odd numbered elements of the data stream, respectively; an amplitude clipping unit which clips an amplitude of each of the inverse Fourier transformed even numbered elements and odd numbered elements; and a Space-Frequency block coding unit which Space-Frequency block codes the amplitude-clipped even numbered elements and odd numbered elements and generates a plurality of data streams, the plurality of data streams being orthogonal to each other.

According to another aspect of the present invention, there is provided a wireless data receiving apparatus which receives a data stream via a wireless channel, the apparatus including: a first Fourier transform unit which performs a Fourier transform of a first data stream and generates data in a frequency domain; a orthogonal decoding unit which decodes the generated data in the frequency domain and generates a second data stream; and an amplitude clipping distortion compensation unit which determines whether to clip an amplitude of the first data stream based on the second data stream, compensates a distortion with respect to the clipped amplitude of the first data stream according to a result of the determining, and generates a third data stream.

According to still another aspect of the present invention, there is provided a wireless data transmission method which transmits a data stream via a plurality of antennas, the method including: Space-Time block coding a first data stream into a plurality of second data streams, the plurality of second data streams being orthogonal to each other; performing an inverse Fourier transform of each of the Space-Time block coded second data stream and generating a plurality of time domain signals; and clipping an amplitude of each of the plurality of generated time domain signals.

According to yet another aspect of the present invention, there is provided a wireless data transmission method which transmits a data stream via a plurality of antennas, the method including: performing an inverse Fourier transform of even numbered elements and odd numbered elements of the data stream, respectively; clipping an amplitude of each of the inverse Fourier transformed even numbered elements and odd numbered elements; and Space-Frequency block coding the amplitude-clipped even numbered elements and odd numbered elements and generating a plurality of data streams, the plurality of data streams being orthogonal to each other.

According to further another aspect of the present invention, there is provided a wireless data receiving method which receives a data stream via a wireless channel, the method including: performing a Fourier transform of a first data stream and generating data in a frequency domain; orthogonal-decoding the generated data in the frequency domain and generating a second data stream; and determining whether to clip an amplitude of the first data stream based on the second data stream, compensating a distortion with respect to the clipped amplitude of the first data stream according to a result of the determining, and generating a third data stream.

BRIEF DESCRIPTION OF THE DRAWINGS

The above and other aspects of the present invention will become apparent and more readily appreciated from the following detailed description of certain exemplary embodiments of the invention, taken in conjunction with the accompanying drawings of which.

DETAILED DESCRIPTION OF EXEMPLARY EMBODIMENTS

Figure 1:
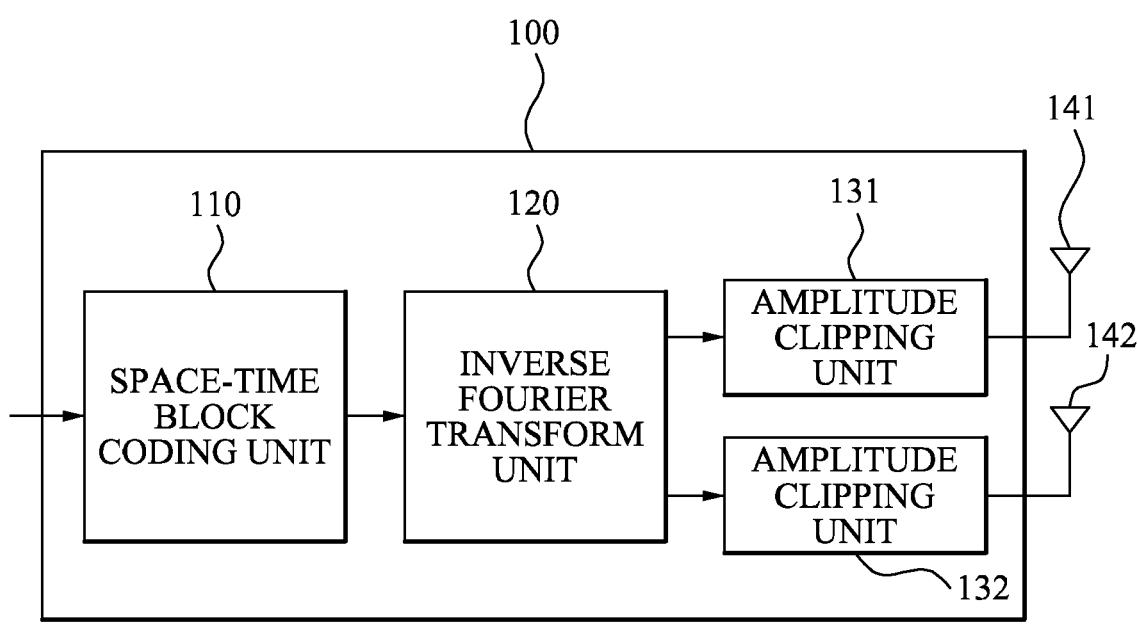
FIG. 1 is a block diagram illustrating a wireless data transmission apparatus using an orthogonal frequency division multiplexing (OFDM) scheme and Space-Time block coding (STBC) according to an exemplary embodiment of the present invention.

Reference will now be made in detail to exemplary embodiments of the present invention, examples of which are illustrated in the accompanying drawings, wherein like reference numerals refer to the like elements throughout. The exemplary embodiments are described below in order to explain the present invention by referring to the figures.

FIG. 1 is a block diagram illustrating a wireless data transmission apparatus using an orthogonal frequency division multiplexing (OFDM) scheme and Space-Time block coding (STBC) which enables an orthogonality of a signal transmitted via each antenna to be maintained and clips an amplitude of a transmission signal according to an exemplary embodiment of the present invention. Hereinafter, referring to FIG. 1, the wireless data transmission apparatus which transmits a signal whose amplitude is clipped is described in detail. The wireless data transmission apparatus 100 includes a Space-Time block coding unit 110, an inverse Fourier transform unit 120, amplitude clipping units 131 and 132, and a plurality of antennas 141 and 142.

The Space-Time block coding unit 110 divides data, transmitted by the wireless data transmission apparatus 100, into a first data stream of a predetermined length. Also, the Space-Time block coding unit 110 Space-Time block codes the first data stream and generates a plurality of second data streams which are orthogonal to each other.

According to the present exemplary embodiment, the Space-Time block coding unit 110 may Space-Time block code the first data stream including two sequential data, and generate two data streams orthogonal to each other, which are represented as, $$C_1 = [\, X_1 \quad X_2 \,] \qquad \text{[Equation 1]}$$

$$C_2 = \begin{bmatrix} X_2^* & X_1 \\ -X_1^* & X_2 \end{bmatrix}.$$

Here, $C_1$ is the first data stream including data $X_1$ and data $X_2$. $C_2$ is a matrix including the plurality of second data streams. Each row of $C_2$ is the second data stream orthogonal to each other. The data $X_1$ and the data $X_2$ are sequential, and a capital letter indicates data in a frequency domain.

According to the present exemplary embodiment, the two second data streams orthogonal to each other are generated using the two data. However, according to another exemplary embodiment, the Space-Time block coding unit 110 may generate an N number of second data streams, orthogonal to each other, using an N number of data.

The inverse Fourier transform unit 120 performs an inverse Fourier transform of each of the second data stream, which is Space-Time block coded by the Space-Time block coding unit 110, and generates a plurality of time domain signals.

The amplitude clipping units 131 and 132 clip an amplitude of each of the plurality of time domain signals, generated by the inverse Fourier transform unit 120, and generate an amplitude-clipped signal.

According to the present exemplary embodiment, each of the amplitude clipping units 131 and 132 clips the amplitude of each of the plurality of generated time domain signals only when the amplitude is greater than an amplitude clipping threshold. Each of the amplitude clipping units 131 and 132 does not clip the amplitude of each of the plurality of generated time domain signals when the amplitude is less than the amplitude clipping threshold.

According to the present exemplary embodiment, each of the amplitude clipping units 131 and 132 may clip the amplitude of each of the plurality of generated time domain signals using the amplitude clipping threshold.

According to the present exemplary embodiment, the Space-Time block coding unit 110 Space-Time block codes data to be transmitted and generates a plurality of signals, orthogonal to each other, in a frequency domain. The inverse Fourier transform unit 120 performs an inverse Fourier transform of the plurality of signals in the frequency domain and generates the plurality of time domain signals. When each of the amplitude clipping units 131 and 132 clips the amplitude of each of the plurality of time domain signals, each of the plurality of time domain signals is orthogonal. Since signals, transmitted via a plurality of transmission antennas, are orthogonal to each other, the wireless data receiving apparatus may receive a transmission signal using a transmit diversity method using the orthogonality.

Figure 2:
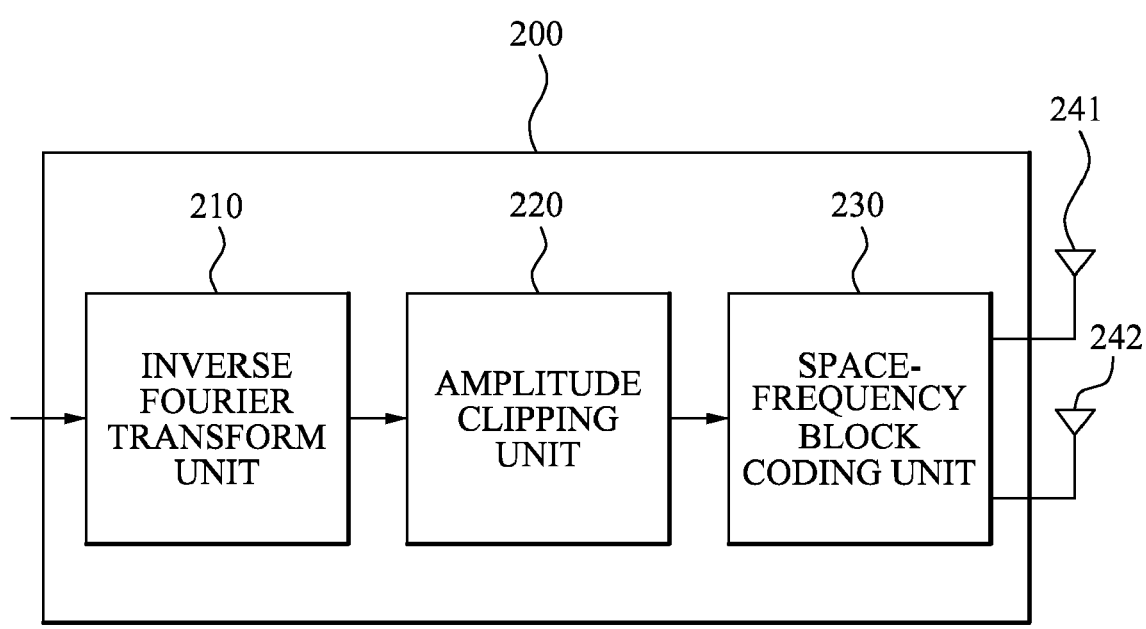
FIG. 2 is a block diagram illustrating a wireless data transmission apparatus using an OFDM scheme and Space-Frequency block coding (SFBC) according to an exemplary embodiment of the present invention.

FIG. 2 is a block diagram illustrating a wireless data transmission apparatus using an OFDM scheme and Space-Frequency block coding (SFBC) which enables an orthogonality of a signal transmitted via each antenna to be maintained and clips an amplitude of a transmission signal according to an exemplary embodiment of the present invention. Hereinafter, referring to FIG. 2, the wireless data transmission apparatus which transmits an amplitude-clipped signal is described in detail.

An inverse Fourier transform unit 210 performs an inverse Fourier transform of a data stream in a frequency domain and generates a data stream in a time domain.

According to the present exemplary embodiment, the inverse Fourier transform unit 210 divides the data stream in the frequency domain into even numbered elements and odd numbered elements, performs an inverse Fourier transform of the even numbered elements and odd numbered elements of the data stream, respectively, and thereby may generate even numbered elements and odd numbered elements in the time domain.

An amplitude clipping unit 220 clips an amplitude of each of the even numbered elements and odd numbered elements in the time domain.

According to the present exemplary embodiment, the amplitude clipping unit 220 does not clip the amplitude of each of the even numbered elements and odd numbered elements in the time domain, when the amplitude is less than an amplitude clipping threshold. Only when the amplitude is greater than the amplitude clipping threshold may the amplitude clipping unit 220 clip the amplitude of each of the even numbered elements and odd numbered elements in the time domain.

According to the present exemplary embodiment, the amplitude clipping unit 220 may clip the amplitude of each of the even numbered elements and odd numbered elements in the time domain, when the amplitude is greater than a predetermined value.

A Space-Frequency block coding unit 230 Space-Frequency block codes the amplitude-clipped even numbered elements and odd numbered elements in the time domain, and generates a plurality of data streams in the time domain. The plurality of data streams is orthogonal to each other.

According to the present exemplary embodiment, the Space-Frequency block coding unit 230 may generate the plurality of data streams in the time domain using the even numbered elements and odd numbered elements in the time domain, which is represented as, $$\bar{x}_1[k] = \frac{1}{\sqrt{2}} \cdot \{\bar{x}^e[k] + W_N^{-k} \cdot \bar{x}^o[k]\} \quad \text{[Equation 2]}$$

$$\bar{x}_2[k] = \frac{1}{\sqrt{2}} \cdot \{\bar{x}^{o^*}[-k]_{(N/2)} + W_N^{-k} \cdot \bar{x}^{e^*}[-k]_{(N/2)}\},$$

where $\bar{x}_1[k]$ and $\bar{x}_2[k]$ are $k^{th}$ elements of the data streams in the time domain, which are generated by Space-Frequency block coding. The data streams in the time domain are orthogonal to each other. $\bar{x}^e[k]$ is an element in which the even numbered elements in the time domain, $x^e[k]$, is amplitude-clipped. $\bar{x}^o[k]$ is an element in which the odd numbered elements in the time domain, $x^o[k]$, is amplitude-clipped.

$W_N^{-k}$ is determined by, $$W_N^{-k} = e^{-j2\pi\frac{k}{N}}, \quad \text{[Equation 3]}$$

where K is a positive number and $0 \leq k < N$. N is a length of a data block which is Space-Time block coded by the Space-Time block coding unit 230.

According to the present exemplary embodiment, the inverse Fourier transform unit 210 performs an inverse Fourier transform of even numbered elements and odd numbered elements of a wireless data stream, respectively. The amplitude clipping unit 220 clips an amplitude of each of the inverse Fourier transformed even numbered elements and odd numbered elements. The Space-Frequency block coding unit 230 Space-Frequency block codes the amplitude-clipped signal, and generates the plurality of data streams. The plurality of data streams is orthogonal to each other. The wireless data receiving apparatus may receive a transmission signal using a transmit diversity method using the orthogonality.

When a Space-Frequency block coded signal is inverse-Fourier-transformed, a plurality of time domain signals is generated, and an amplitude of each of the plurality of time domain signals is clipped in the same way as a Space-Time block coding, the amplitude-clipped signals are no longer orthogonal. Accordingly, the wireless data receiving apparatus may not receive a transmission signal using a transmit diversity method.

Figure 3:
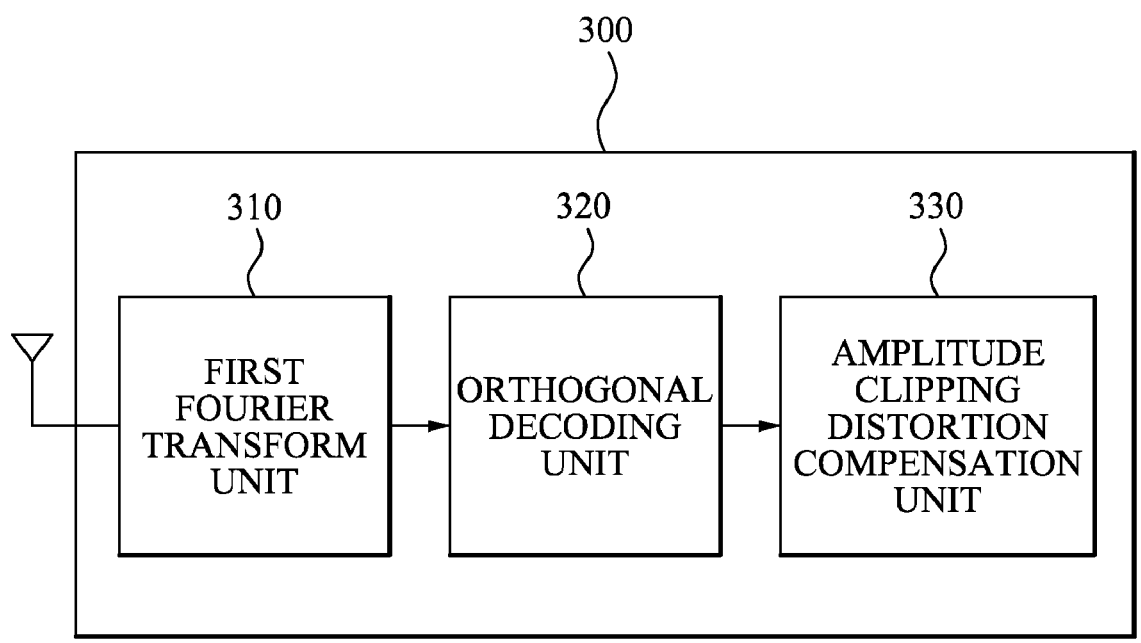
FIG. 3 is a block diagram illustrating a wireless data receiving apparatus using an OFDM scheme and orthogonal coding which compensates an amplitude clipping distortion based on an amplitude-clipped received signal and receives a signal according to an exemplary embodiment of the present invention.

FIG. 3 is a block diagram illustrating a wireless data receiving apparatus using an OFDM scheme and orthogonal coding which compensates an amplitude clipping distortion based on an amplitude-clipped received signal and receives a signal according to an exemplary embodiment of the present invention. Hereinafter, referring to FIG. 3, the wireless data receiving apparatus is described in detail. The wireless data receiving apparatus 300 includes a first Fourier transform unit 310, an orthogonal decoding unit 320, and an amplitude clipping distortion compensation unit 330.

The first Fourier transform unit 310 performs a Fourier transform of a first data stream in a time domain and generates data in a frequency domain. The first data stream in the time domain is received by the wireless data receiving apparatus 300.

The orthogonal decoding unit 320 decodes the generated data in the frequency domain and generates a second data stream in the frequency domain.

According to the present exemplary embodiment, the first data stream in the time domain is Space-Time block coded.

The orthogonal decoding unit 320 Space-Time block decodes the data in the frequency domain, and thereby may generate the second data stream in the frequency domain.

According to the present exemplary embodiment, the first data stream in the time domain is Space-Frequency block coded. The orthogonal decoding unit 320 Space-Frequency block decodes the data in the frequency domain, and thereby may generate the second data stream.

The amplitude clipping distortion compensation unit 330 determines whether to clip an amplitude of the first data stream based on the second data stream, compensates a distortion with respect to the clipped amplitude of the first data stream according to a result of the determining, and generates a third data stream.

Figure 4:
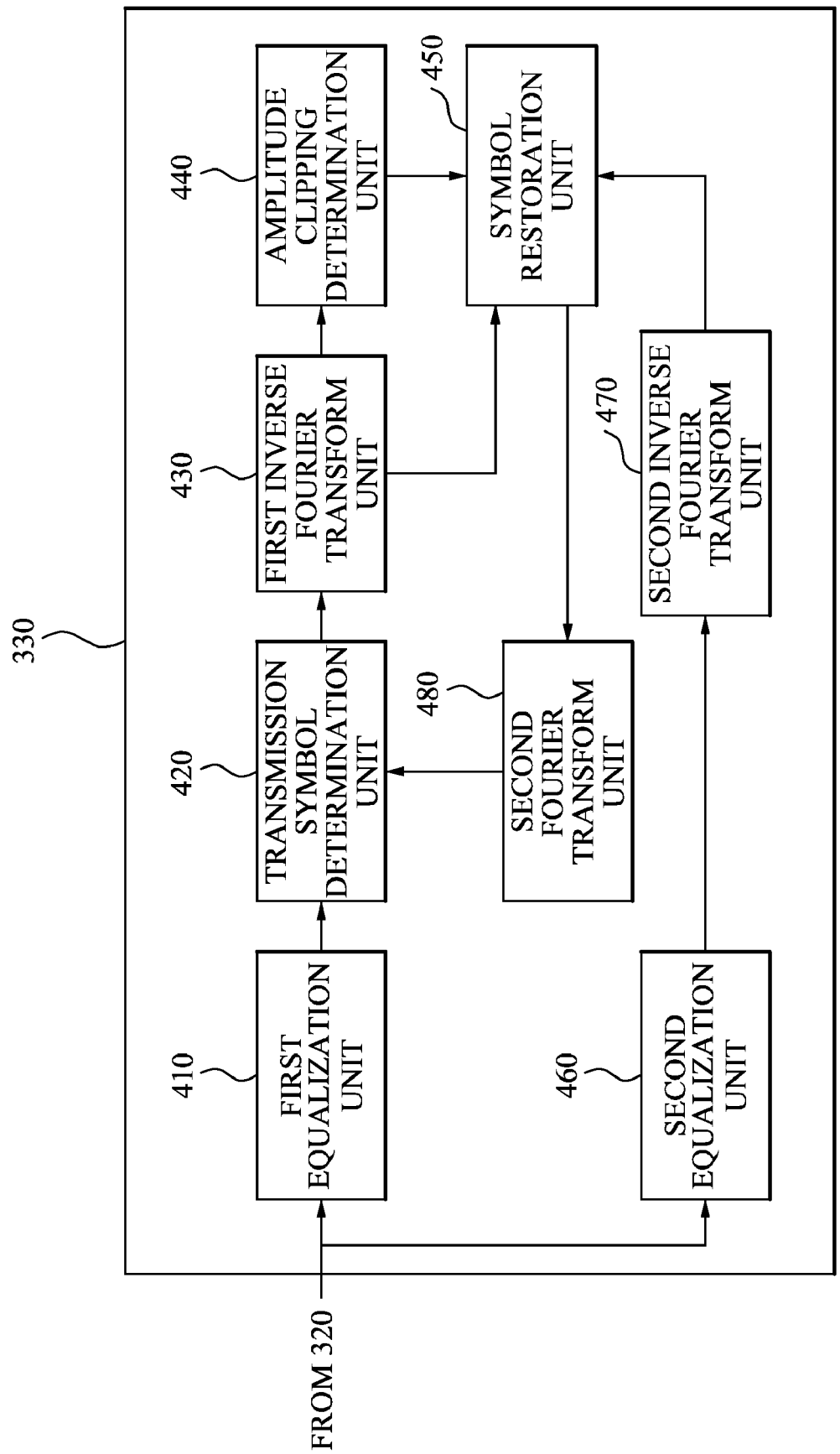
FIG. 4 is a block diagram illustrating an amplitude clipping distortion compensation unit in a wireless data receiving apparatus using an OFDM scheme and orthogonal coding which compensates a distortion of a received signal due to an amplitude clipping according to an exemplary embodiment of the present invention.

FIG. 4 is a block diagram illustrating an amplitude clipping distortion compensation unit in a wireless data receiving apparatus using an OFDM scheme and orthogonal coding which compensates a distortion of a received signal due to an amplitude clipping according to an exemplary embodiment of the present invention. Hereinafter, referring to FIG. 4, the amplitude clipping distortion compensation unit is described in detail. The amplitude clipping distortion compensation unit 330 includes a first equalization unit 410, a transmission symbol determination unit 420, a first inverse Fourier transform unit 430, an amplitude clipping determination unit 440, a symbol restoration unit 450, a second equalization unit 460, a second inverse Fourier transform unit 470, and a second Fourier transform unit 480.

The first equalization unit 410 compensates a wireless channel distortion and amplitude clipping distortion of a second data stream in a frequency domain, and generates a first equalization signal.

According to the present exemplary embodiment, the first equalization unit 410 may determine an equalization coefficient based on a power of a signal before an amplitude is clipped, a state of the wireless channel from a wireless data transmission apparatus to the wireless data receiving apparatus, and a ratio between an amplitude of a signal before an amplitude of a first data stream is clipped and an amplitude of the signal after the amplitude of the first data stream is clipped in the wireless data transmission apparatus.

According to the present exemplary embodiment, the first equalization unit 410 may determine the equalization coefficient, which is represented as, $$C_m[n] = \frac{\alpha \sigma_X^2}{(1 - e^{-\gamma^2})\Lambda_m[n]\sigma_X^2 + N_o}, \quad \text{[Equation 4]}$$

where $C_m[n]$ is an equalization coefficient of an $n^{th}$ sub-channel in an $m^{th}$ time of the first equalization unit 410. $\sigma_x^2$ is an electrical power of the signal before the amplitude is clipped in the wireless data transmission apparatus, and is determined by $\sigma_x^2 = E[|x|^2]$. $\gamma$ is the ratio between the amplitude of the signal before the amplitude of the first data stream is clipped and the amplitude of the signal after the amplitude of the first data stream is clipped. When an amplitude of a transmission signal whose amplitude is greater than A is to be clipped using A, the ratio is determined by $$\gamma = \frac{A}{\sigma}.$$

α is an attenuation ratio of transmission signal due to the amplitude clipping, and determined by $$\alpha = 1 - e^{-\gamma^2} + \frac{\sqrt{\pi}}{2} \cdot \text{erfc}(\gamma).$$

$\Lambda_m[n]$ is status information of the wireless channel of the $n^{th}$ sub-channel in the $m^{th}$ time, and determined by $\Lambda_m[n]=|H_{1,m}[n]|^2+|H_{2,m}[n]|^2$. $H_{i,m}[n]$ is status information of the wireless channel of the $n^{th}$ sub-channel in the $m^{th}$ time, from an $i^{th}$ transmission antenna to a receiving antenna of the wireless data receiving apparatus. The $i^{th}$ transmission antenna is installed in the wireless data transmission apparatus. $N_e$ is a power of thermal noise generated in the wireless data receiving apparatus.

The transmission symbol determination unit 420 determines a transmission symbol in the frequency domain through a hard decision of the first equalization signal in the frequency domain. In this instance, in the first equalization signal, the wireless channel distortion and amplitude clipping distortion are compensated.

The first inverse Fourier transform unit 430 performs an inverse Fourier transform of the transmission symbol in the frequency domain, and generates a transmission symbol in a time domain.

According to the present exemplary embodiment, the first data stream is Space-Frequency block coded. The first inverse Fourier transform unit 430 performs an inverse Fourier transform of even numbered elements and odd numbered elements of the transmission symbol in the frequency domain, respectively, and may generate the transmission symbol in the time domain.

The amplitude clipping determination unit 440 determines whether to clip the amplitude of the first data stream based on an amplitude of the transmission symbol in the time domain.

According to the present exemplary embodiment, the amplitude clipping determination unit 440 may determine that the amplitude of the first data stream is to be clipped when the amplitude of the transmission symbol in the time domain is greater than an amplitude clipping threshold A.

The second equalization unit 460 compensates a wireless channel distortion of the second data stream in the frequency domain, and generates a second equalization signal in the frequency domain.

According to the present exemplary embodiment, the second equalization unit 460 may determine an equalization coefficient based on a state of the wireless channel and a power of the second data stream.

According to the present exemplary embodiment, the second equalization unit 460 may determine the equalization coefficient, which is represented as, $$W_m[n] = \frac{\sigma_X^2}{\Lambda_m[n]\sigma_X^2 + N_o}, \quad \text{[Equation 5]}$$

where $W_m[n]$ is an equalization coefficient of an $n^{th}$ sub-channel in an $m^{th}$ time of the second equalization unit 420. $\sigma_x^2$ is an electrical power of a signal before an amplitude is clipped in a wireless data transmission apparatus, and is determined by $\sigma_x^2=E[|x|^2]$. $\Lambda_m[n]$ is status information of the wireless channel of the $n^{th}$ sub-channel in the $m^{th}$ time, and determined by wireless channel of the $n^{th}$ sub-channel in the $m^{th}$ time, from an $i^{th}$ transmission antenna to a receiving antenna of the wireless data receiving apparatus. The $i^{th}$ transmission antenna is installed in the wireless data transmission apparatus. $N_e$ is a power of thermal noise generated in the wireless data receiving apparatus.

The second inverse Fourier transform unit 470 performs an inverse Fourier transform of the second equalization signal in the frequency domain, and generates the second equalization signal in the time domain. The second equalization signal in the frequency domain is generated by compensating the wireless channel distortion in the frequency domain.

According to the present exemplary embodiment, the first data stream is Space-Frequency block coded, and the second inverse Fourier transform unit 470 may perform an inverse Fourier transform of even numbered elements and odd numbered elements of the second equalization signal in the frequency domain, respectively, and generate the second equalization signal in the time domain.

According to the present exemplary embodiment, the symbol restoration unit 450 may generate a distortion-compensated third data stream in the time domain, which is represented as, $$y = \begin{cases} |x_1|e^{-j\arg(x_2)}, & |x_1| > A \\ x_2, & |x_1| \leq A, \end{cases} \quad \text{[Equation 6]}$$

where y is the third data stream. $x_1$ is the transmission symbol, generated by the first inverse Fourier transform unit 430, in the time domain. $x_2$ is the second equalization signal, generated by the second inverse Fourier transform unit 470, in the time domain. $\arg(x_2)$ is a phase of $x_2$.

According to the present exemplary embodiment, an amplitude clipping distortion compensation unit 330 iteratively performs an amplitude clipping distortion compensation operation, and thereby may compensate the distortion of a clipped amplitude of the first data stream received by a wireless data receiving apparatus 300.

According to the present exemplary embodiment, when an absolute value of the transmission symbol, generated by the first inverse Fourier transform unit 430, in the time domain is greater than the amplitude clipping threshold, the amplitude clipping determination unit 440 may determine that the amplitude of the first data stream is to be clipped. In this case, the symbol restoration unit 450 may compensate the distortion with respect to the clipped amplitude of the first data stream, based on the amplitude of the transmission symbol in the time domain and a phase of the second equalization signal in the time domain, and generate the third data stream in the time domain. When the absolute value of the transmission symbol, generated by the first inverse Fourier transform unit 430, in the time domain is less than the amplitude clipping threshold, the amplitude clipping determination unit 440 may determine that the amplitude of the first data stream is not to be clipped. In this case, the symbol restoration unit 450 may generate the third data stream in the time domain based on the second equalization signal in the time domain.

According to the present exemplary embodiment, the second Fourier transform unit 480 may perform a Fourier transform of the distortion-compensated third data stream in the time domain, and generate a third data stream in the frequency domain.

According to the present exemplary embodiment, the first data stream, received by the wireless data receiving apparatus, in the frequency domain is Space-Frequency block coded, and the second Fourier transform unit 480 may perform a Fourier transform of even numbered elements and odd numbered elements of the third data stream in the time domain, respectively, and generate the third data stream in the frequency domain.

The transmission symbol determination unit 420 determines a transmission symbol in the frequency domain through a hard decision of the third data stream in the frequency domain. The first inverse Fourier transform unit 430 performs an inverse Fourier transform of the transmission symbol in the frequency domain into a time domain symbol. The amplitude clipping determination unit 440 determines whether to clip the amplitude of the first data stream based on an amplitude of the determined transmission symbol in the time domain. The amplitude clipping determination unit 440 determines whether to clip the amplitude of the first data stream based on an amplitude of the transmission symbol in the time domain. In this instance, the transmission symbol in the time domain is generated based on the third data stream in the frequency domain. The symbol restoration unit 450 may generate the third data stream in the time domain again, based on the amplitude of the transmission symbol in the time domain and a phase of the second equalization signal in the time domain, according to a result of the determining.

According to the present exemplary embodiment, the amplitude clipping distortion compensation unit 330 iteratively performs an amplitude clipping distortion compensation operation, and thereby may compensate the distortion of clipped amplitude of the first data stream received by a wireless data receiving apparatus 300.

Figure 5:
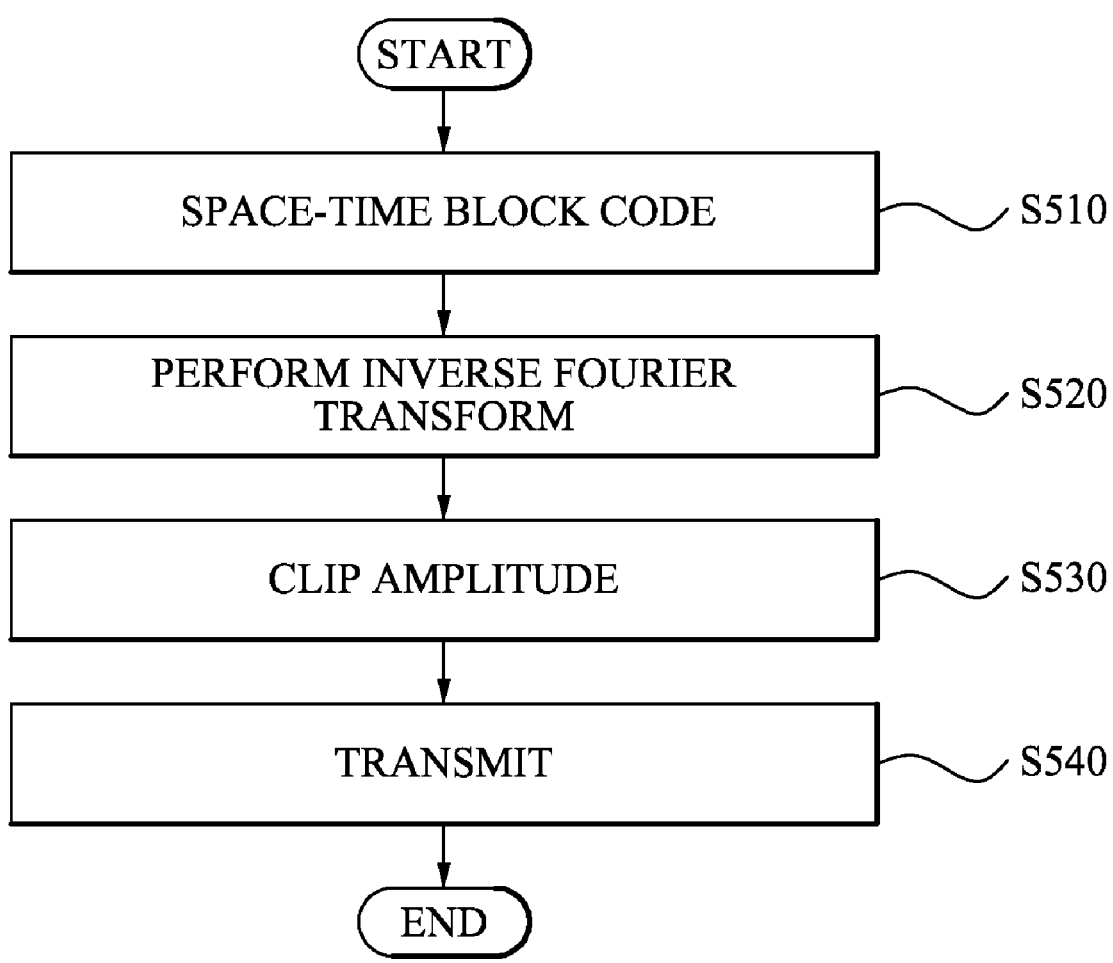
FIG. 5 is a flowchart illustrating a wireless data transmission method using an OFDM scheme and STBC according to an exemplary embodiment of the present invention.

FIG. 5 is a flowchart illustrating a wireless data transmission method using an OFDM scheme and STBC which enables an orthogonality of a signal transmitted via each antenna to be maintained and clips an amplitude of a transmission signal according to an exemplary embodiment of the present invention. Hereinafter, referring to FIG. 5, the method of transmitting an amplitude-clipped signal is described in detail.

In operation S510, data to be transmitted is separated into a block of a predetermined length, is Space-Time block coded, and a plurality of data streams orthogonal to each other is generated.

In operation S520, a plurality of time domain signals is generated by performing an inverse Fourier transform of the plurality of data streams, which are generated by Space-Time block coding and orthogonal to each other.

In operation S530, an amplitude of each of the plurality of generated time domain signals is clipped.

According to the present exemplary embodiment, when the amplitude of each of the plurality of time domain signals is greater than an amplitude clipping threshold, the amplitude of each of the plurality of time domain signals is to be clipped. Also, when the amplitude of each of the plurality of time domain signals is less than an amplitude clipping threshold, the amplitude of each of the plurality of time domain signals is not to be clipped.

According to the present exemplary embodiment, when the amplitude of each of the plurality of time domain signals is greater than the amplitude clipping threshold, the amplitude of each of the plurality of time domain signals may be clipped using the amplitude clipping threshold.

In operation S540, the amplitude-clipped signal is transmitted to a wireless data receiving apparatus via a plurality of antennas.

Figure 6:
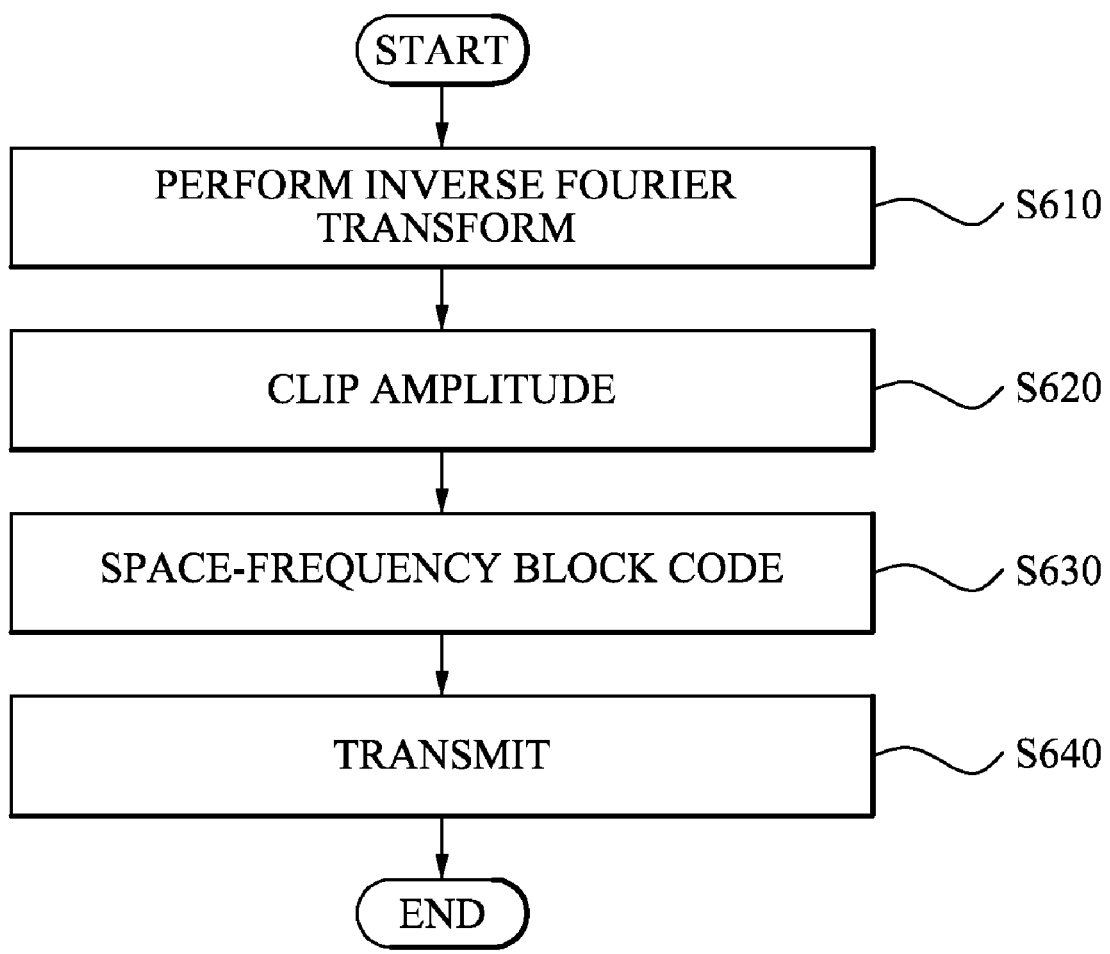
FIG. 6 is a flowchart illustrating a wireless data transmission method using an OFDM scheme and SFBC according to an exemplary embodiment of the present invention.

FIG. 6 is a flowchart illustrating a wireless data transmission method using an OFDM scheme and SFBC which enables an orthogonality of a signal transmitted via each antenna to be maintained and clips an amplitude of a transmission signal according to an exemplary embodiment of the present invention. Hereinafter, referring to FIG. 6, a method of transmitting an amplitude-clipped signal is described in detail.

In operation S610, even numbered elements and odd numbered elements of a data stream to be transmitted are inverse-Fourier-transformed, respectively, and a data stream in a time domain is generated.

In operation S620, an amplitude of each of the inverse Fourier transformed even numbered elements and odd numbered elements in the time domain is clipped.

According to the present exemplary embodiment, when the amplitude of each of the even numbered elements and odd numbered elements in the time domain is greater than an amplitude clipping threshold, the amplitude of each of the even numbered elements and odd numbered elements in the time domain is to be clipped. When the amplitude of each of the even numbered elements and odd numbered elements in the time domain is less than the amplitude clipping threshold, the amplitude of each of the even numbered elements and odd numbered elements in the time domain is not to be clipped.

According to the present exemplary embodiment, when the amplitude of each of the even numbered elements and odd numbered elements in the time domain is greater than the amplitude clipping threshold, the amplitude of each of the even numbered elements and odd numbered elements in the time domain may be clipped using the amplitude clipping threshold.

In operation S630, the amplitude-clipped even numbered elements and odd numbered elements are Space-Frequency block coded, and a plurality of data streams, orthogonal to each other, is generated.

In operation S640, the plurality of generated data streams, orthogonal to each other, is transmitted to a wireless data receiving apparatus via a plurality of antennas.

Figure 7:
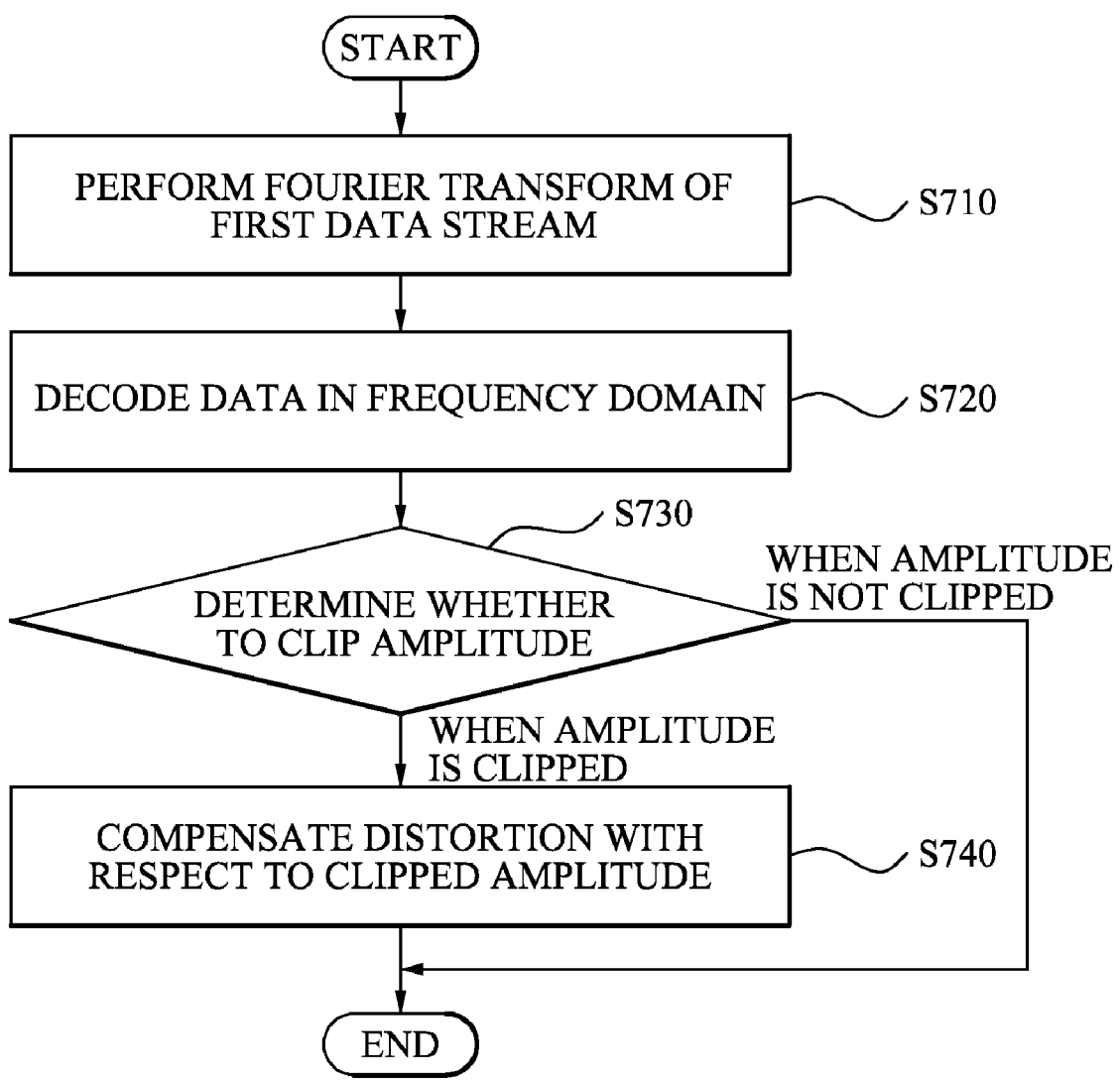
FIG. 7 is a flowchart illustrating a wireless data receiving method using an OFDM scheme and STBC according to an exemplary embodiment of the present invention.

FIG. 7 is a flowchart illustrating a wireless data receiving method using an OFDM scheme and orthogonal coding which receives a signal and compensates an amplitude clipping distortion based on a received signal whose amplitude is clipped according to an exemplary embodiment of the present invention. Hereinafter, referring to FIG. 7, the wireless data receiving method when an amplitude of transmission signal is to be clipped is described in detail.

In operation S710, a first data stream in a time domain, which is orthogonal-coded, is received, Fourier-transformed, and thus data in a frequency domain is generated.

In operation S720, the generated data in the frequency domain is orthogonal-decoded, and thus a second data stream in the frequency domain is generated.

According to the present exemplary embodiment, the first data stream in the time domain is Space-Time block coded or Space-Frequency block coded. In operation S710, the Space-Time block coded or Space-Frequency block coded first data stream is Fourier-transformed, and thus the data in the frequency domain may be generated. In operation S720, the data in the frequency domain is Space-Time block decoded or Space-Frequency block decoded, and thus the second data stream in the frequency domain may be generated.

In operation S730, it is determined whether the received first data stream in the time domain is amplitude-clipped and transmitted in a wireless data transmission apparatus, based on the generated second data stream in the frequency domain.

In operation S740, according to a result of the determining, when the first data stream in the time domain is amplitude-clipped and transmitted, a distortion due to the clipped amplitude is compensated.

The determining in operation S730 and the compensating in operation S740 are described in detail with reference to FIG. 8.

Figure 8:
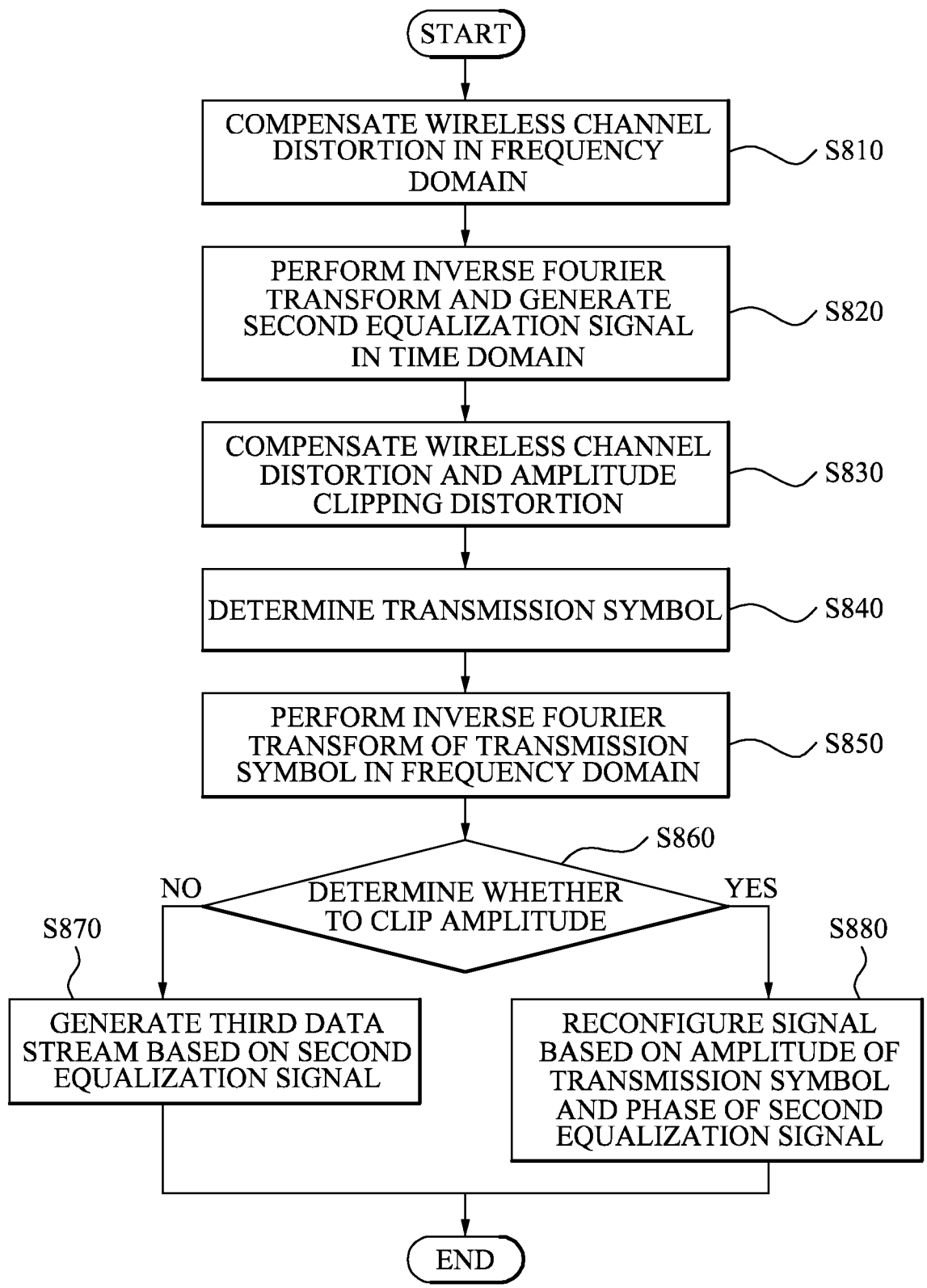
FIG. 8 is a flowchart illustrating a wireless data receiving method using an OFDM scheme and SFBC according to an exemplary embodiment of the present invention.

FIG. 8 is a flowchart illustrating a wireless data receiving method using an OFDM scheme and orthogonal coding which compensates an amplitude clipping distortion based on a received signal whose amplitude is clipped and reconstructs a transmission signal according to an exemplary embodiment of the present invention. Hereinafter, referring to FIG. 8, a method of reconstructing a transmission signal is described in detail.

In operation S810, a wireless channel distortion of the second data stream is compensated in the frequency domain, and thus a second equalization signal is generated in the frequency domain.

According to the present exemplary embodiment, an equalization coefficient which compensates the distortion due to the wireless channel may be determined based on a state of the wireless channel and a power of the second data stream.

According to the present exemplary embodiment, the equalization coefficient which compensates the distortion due to the wireless channel distortion may be determined by, $$W_m[n] = \frac{\sigma_X^2}{\Lambda_m[n]\sigma_X^2 + N_o},$$ [Equation 7]

where $W_m[n]$ is an equalization coefficient of an $n^{th}$ sub-channel in an $m^{th}$ time, and compensates the distortion due to the wireless channel distortion. $\sigma_x^2$ is an electrical power of a signal before an amplitude is clipped in a wireless data transmission apparatus, and is determined by $\sigma_x^2 = E[|x|^2]$. $\Lambda_m[n]$ is status information of the wireless channel of the $n^{th}$ sub-channel in the $m^{th}$ time, and determined by $\Lambda_m[n] = |H_{1,m}[n]|^2 + |H_{2,m}[n]|^2$. $H_{i,m}[n]$ is status information of the wireless channel of the $n^{th}$ sub-channel in the $m^{th}$ time, from an $i^{th}$ transmission antenna to a receiving antenna of the wireless data receiving apparatus. The $i^{th}$ transmission antenna is installed in the wireless data transmission apparatus. $N_e$ is a power of thermal noise generated in the wireless data receiving apparatus.

In operation S820, the second equalization signal in the frequency domain is inverse-Fourier-transformed, and thus a second equalization signal in the time domain is generated.

According to the present exemplary embodiment, the first data stream is Space-Frequency block coded, even numbered elements and odd numbered elements of the second equalization signal in the frequency domain are inverse-Fourier-transformed, and thus the second equalization signal in the time domain may be generated in operation S820.

In operation S830, a wireless channel distortion and amplitude clipping distortion of the second data stream are compensated in the frequency domain, and a first equalization signal is generated.

According to the present exemplary embodiment, an equalization coefficient which compensates the wireless channel distortion and amplitude clipping distortion may be determined based on a state of the wireless channel, and a ratio between an amplitude of a signal before the amplitude of the first data stream is clipped and an amplitude of a signal after the amplitude of the first data stream is clipped.

According to the present exemplary embodiment, the equalization coefficient which compensates the wireless channel distortion and amplitude clipping distortion may be determined by, $$C_m[n] = \frac{\alpha \sigma_x^2}{(1-e^{-\gamma^2})\Lambda_m[n]\sigma_x^2 + N_o},$$ [Equation 8]

where $C_m[n]$ is an equalization coefficient of an $n^{th}$ sub-channel in an $m^{th}$ time, and compensates the wireless channel distortion and amplitude clipping distortion. $\sigma_x^2$ is an electrical power of the signal before the amplitude of the first data stream is clipped, and is determined by $\sigma_x^2 = E[|x|^2]$. $\gamma$ is the ratio between the amplitude of the signal before the amplitude of the first data stream is clipped and the amplitude of the signal after the amplitude of the first data stream is clipped. When an amplitude of a transmission signal whose amplitude is greater than A is clipped using A, the ratio is determined by $$\gamma = \frac{A}{\sigma}.$$

$\alpha$ is an attenuation ratio of a transmission signal due to the amplitude clipping, and determined by $$\alpha = 1 - e^{-\gamma^2} + \frac{\sqrt{\pi}}{2} \cdot \text{erfc}(\gamma).$$

$\Lambda_m[n]$ is status information of the wireless channel of the $n^{th}$ sub-channel in the $m^{th}$ time, and determined by $\Lambda_m[n]=|H_{1,m}[n]|^2+|H_{2,m}[n]|^2$. $H_{i,m}[n]$ is status information of the wireless channel of the $n^{th}$ sub-channel in the $m^{th}$ time, from an $i^{th}$ transmission antenna to a receiving antenna of the wireless data receiving apparatus. The $i^{th}$ transmission antenna is installed in the wireless data transmission apparatus. $N^e$ is a power of thermal noise generated in the wireless data receiving apparatus.

In operation S840, a transmission symbol in the frequency domain is determined through a hard decision of the first equalization signal.

In operation S850, the generated transmission symbol in the frequency domain is inverse-Fourier-transformed, and a transmission symbol in the time domain is generated.

According to the present exemplary embodiment, the first data stream is Space-Frequency block coded, and even numbered elements and odd numbered elements of the transmission symbol in the frequency domain are inverse-Fourier-transformed, respectively, and thus the transmission symbol in the time domain may be generated.

Although, in FIG. 8, embodiments with respect to the generating of the transmission symbol in the time domain in operation S830 and operation S840 and the generating of the second equalization signal in operation S810 and operation S820 are sequentially illustrated, the above-described operations may be performed in parallel according to another embodiment of the present invention.

In operation S860, it is determined whether the amplitude of the first data stream is to be clipped, based on an amplitude of the transmission symbol in the frequency domain.

According to the present exemplary embodiment, when the amplitude of the transmission symbol in the time domain is greater than an amplitude clipping threshold A, it may be determined that the amplitude of the first data stream is to be clipped. In this instance, the transmission symbol in the time domain is generated based on the transmission symbol in the frequency domain. When the amplitude is to be clipped in the wireless data transmission apparatus, and when the amplitude of the transmission symbol is greater than the amplitude clipping threshold A, the amplitude is clipped, and when the amplitude of the transmission symbol is less than the amplitude clipping threshold A, the amplitude is not to be clipped. Accordingly, an amplitude of a portion of the first data stream is clipped.

According to the present exemplary embodiment, when the amplitude of the transmission symbol in the time domain is greater than the amplitude clipping threshold A, it may be determined that the amplitude of the first data stream is to be clipped. In this instance, the transmission symbol in the time domain is generated based on the transmission symbol in the frequency domain through the hard decision.

When it is determined that the amplitude of the first data stream is not to be clipped in operation S860, the second equalization signal may be generated as a third data stream in operation S870.

When it is determined that the amplitude of the first data stream is clipped in operation S860, the distortion-compensated third data stream may be generated based on the amplitude of the transmission symbol in the time domain and a phase of the second equalization signal in operation S880.

According to the present exemplary embodiment, the third data stream in the time domain is determined by, $$y = \begin{cases} |x_1|e^{-j\arg(x_2)}, & |x_1| > A \\ x_2, & |x_1| \le A \end{cases}$$ [Equation 9]

y is the third data stream in the time domain. $x_1$ is the transmission symbol in the time domain generated in operation S830. $x_2$ is the second equalization signal in the time domain generated in operation S860. $\arg(x_2)$ is a phase of $x_2$.

According to the present exemplary embodiment, when the amplitude of the transmission symbol in the time domain is greater than the amplitude clipping threshold A, it may be determined that the amplitude of the first data stream is to be clipped in operation S860. Also, the third data stream in the time domain may be generated based on the amplitude of the transmission symbol in the time domain and a phase of the second equalization signal in operation S880.

When the amplitude of the transmission symbol in the time domain is less than the amplitude clipping threshold A, it may be determined that the amplitude of the first data stream is not to be clipped in operation S860. Also, the third data stream in the time domain may be generated based on the second equalization signal in operation S870.

Figure 9:
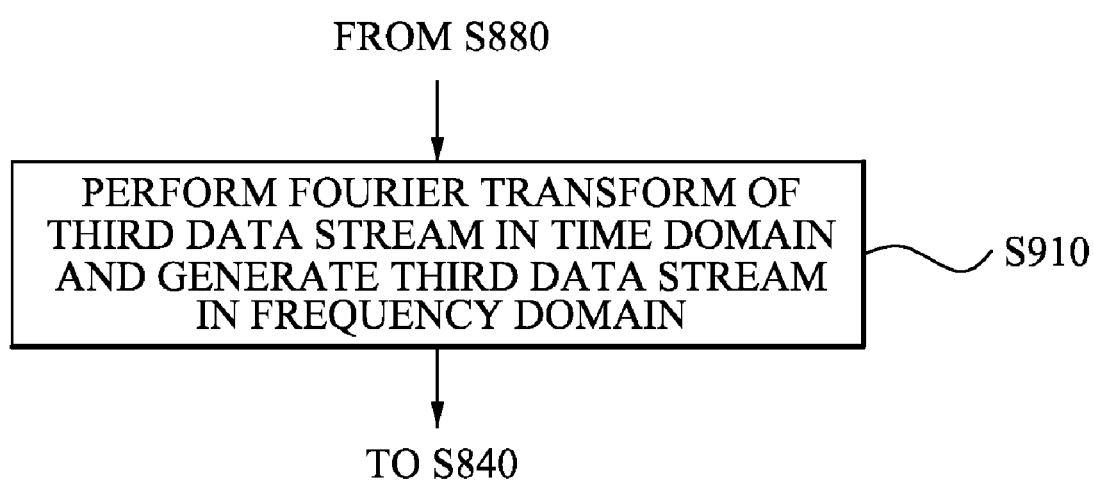
FIG. 9 is a flowchart illustrating a method in which an amplitude clipping distortion is sequentially compensated based on a received signal whose amplitude is clipped and a transmission signal is sequentially reconstructed according to an exemplary embodiment of the present invention.

FIG. 9 is a flowchart illustrating a method in which an amplitude clipping distortion is sequentially compensated based on a received signal whose amplitude is clipped and a transmission signal is sequentially reconstructed according to an exemplary embodiment of the present invention. Hereinafter, referring to FIG. 9, the method which sequentially reconstructs the transmission signal is described in detail.

In operation S910, the distortion-compensated third data stream in the time domain is Fourier transformed, and the third data stream in the frequency domain may be generated.

In operation S840, a transmission symbol in the frequency domain is determined through the hard decision of the third data stream.

In operation S860, it may be determined whether the amplitude of the first data stream is clipped using the transmission symbol generated based on the third data stream. According to a result of the determining, when the amplitude of the first data stream is to be clipped, a distortion-compensated third data stream may be generated again based on an amplitude of the distortion-compensated third data stream and the phase of the second equalization signal in operation S880.

When it is determined that the amplitude of the first data stream is not to be clipped in operation S860, the transmission symbol generated based on the third data stream is generated as the distortion-compensated third data stream again in operation S870.

According to the present exemplary embodiment, the first data stream is Space-Frequency block coded. In operation S910, even numbered elements and odd numbered elements of the third data stream in the time domain are Fourier transformed, respectively, and the third data stream in the frequency domain may be generated.

According to the present exemplary embodiment, the compensating of the amplitude clipping distortion may be repeatedly performed a predetermined number of times.

The wireless data transmission method and wireless data receiving method according to the above-described exemplary embodiments may be recorded in computer-readable media including program instructions to implement various operations embodied by a computer. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

According to the exemplary embodiments of the present invention, there is provided a wireless data transmission apparatus using an OFDM scheme and Space-Time block coding which transmits a signal via multiple antennas and may maintain an orthogonality of a signal, transmitted via each antenna, when an amplitude of the signal transmitted via each antenna is clipped.

According to the exemplary embodiments of the present invention, there is provided a wireless data transmission apparatus using an OFDM scheme and Space-Frequency block coding which transmits a signal via multiple antennas and may maintain an orthogonality of a signal, transmitted via each antenna, when an amplitude of the signal transmitted via each antenna is clipped.

According to the exemplary embodiments of the present invention, there is provided a wireless data receiving apparatus using an OFDM scheme and orthogonal coding which compensates a distortion with respect to a clipped amplitude of a signal, which is amplitude-clipped and transmitted to reduce a peak to average power ratio (PAPR), and may sequentially reconstruct a transmission signal.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A wireless data transmission apparatus comprising:
   an inverse Fourier transform unit which performs an inverse Fourier transform of even numbered elements and odd numbered elements of the data stream, respectively;
   an amplitude clipping unit which clips an amplitude of each of the inverse Fourier transformed even numbered elements and odd numbered elements;
   a Space-Frequency block coding unit which Space-Frequency block codes the amplitude-clipped even numbered elements and odd numbered elements and generates a plurality of data streams, the plurality of data streams being orthogonal to each other, and
   a plurality of antennas which transmit the plurality of data streams.

2. The apparatus of claim 1, wherein the amplitude clipping unit clips the amplitude of each of the inverse Fourier transformed even numbered elements and odd numbered elements when the amplitude is greater than a predetermined value.

3. The apparatus of claim 2, wherein the amplitude clipping unit clips the amplitude of each of the inverse Fourier transformed even numbered elements and odd numbered elements using the predetermined value.

4. A wireless data receiving apparatus comprising:
   an antenna that receives a first data stream;
   a first Fourier transform unit which performs a Fourier transform of the first data stream and generates data in a frequency domain;
   an orthogonal decoding unit which decodes the generated data in the frequency domain and generates a second data stream; and
   an amplitude clipping distortion compensation unit which determines whether to clip an amplitude of the first data stream based on the second data stream, compensates a distortion with respect to the clipped amplitude of the first data stream according to a result of the determining, and generates a third data stream.

5. The apparatus of claim 4, wherein the first data stream is Space-Time block coded, and the orthogonal decoding unit Space-Time block decodes the data in the frequency domain and generates the second data stream.

6. The apparatus of claim 4, wherein the first data stream is Space-Frequency block coded, and the orthogonal decoding unit Space-Frequency block decodes the data in the frequency domain and generates the second data stream.

7. The apparatus of claim 4, wherein the amplitude clipping distortion compensation unit comprises:
   a first equalization unit which compensates a wireless channel distortion and amplitude clipping distortion of the second data stream in the frequency domain and generates a first equalization signal;
   a transmission symbol determination unit which determines a transmission symbol in the frequency domain through a hard decision of the first equalization signal; and
   an amplitude clipping determination unit which determines whether to clip the amplitude of the first data stream based on an amplitude of the determined transmission symbol in the frequency domain.

8. The apparatus of claim 7, wherein the first equalization unit determines an equalization coefficient based on a power of a signal before the amplitude of the signal is clipped, a state of the wireless channel, and a ratio between an amplitude of the signal before the amplitude of the first data stream is clipped and an amplitude of the signal after the amplitude of the first data stream is clipped.

9. The apparatus of claim 7, wherein the first equalization unit determines an equalization coefficient based on an attenuation ratio of a transmission signal due to the amplitude clipping.

10. The apparatus of claim 7, wherein the amplitude clipping distortion compensation unit further comprises a first inverse Fourier transform unit which performs an inverse Fourier transform of the transmission symbol in the frequency domain and generates a transmission symbol in a time domain, and the amplitude clipping determination unit determines that the amplitude of the first data stream is clipped when an amplitude of the transmission symbol in the time domain is greater than a predetermined value.

11. The apparatus of claim 10, wherein the first Fourier transform unit performs a Fourier transform of the Space-Frequency block coded first data stream and generates the data in the frequency domain, and the first inverse Fourier transform unit performs an inverse Fourier transform of even numbered elements and odd numbered elements of the transmission symbol in the frequency domain, respectively, and generates the transmission symbol in the time domain.

12. The apparatus of claim 10, wherein the amplitude clipping distortion compensation unit comprises:
 a second equalization unit which compensates a wireless channel distortion of the second data stream in the frequency domain and generates a second equalization signal in the frequency domain;
 a second inverse Fourier transform unit which performs an inverse Fourier transform of the second equalization signal in the frequency domain and generates a second equalization signal in the time domain; and
 a symbol restoration unit,
 wherein the symbol restoration unit generates a third data stream in the time domain based on the amplitude of the transmission symbol in the time domain and a phase of the second equalization signal in the time domain.

13. The apparatus of claim 12, wherein the first data stream is Space-Frequency block coded, and the second inverse Fourier transform unit performs an inverse Fourier transform of even numbered elements and odd numbered elements of the second equalization signal in the frequency domain, respectively, and generates the second equalization signal in the time domain.

14. The apparatus of claim 12, wherein the second equalization unit determines the equalization coefficient based on the state of the wireless channel and a power of the second data stream.

15. The apparatus of claim 12, wherein the amplitude clipping distortion compensation unit further comprises a second Fourier transform unit which performs a Fourier transform of the third data stream in the time domain and generates a third data stream in the frequency domain, and the transmission symbol determination unit determines the transmission symbol in the frequency domain through the hard decision of the third data stream in the frequency domain.

16. A wireless data transmission method which transmits a data stream via a plurality of antennas, the method comprising:
 performing an inverse Fourier transform of even numbered elements and odd numbered elements of the data stream, respectively;
 clipping an amplitude of each of the inverse Fourier transformed even numbered elements and odd numbered elements;
 Space-Frequency block coding the amplitude-clipped even numbered elements and odd numbered elements and generating a plurality of data streams, the plurality of data streams being orthogonal to each other; and
 transmitting the plurality of generated data streams to a wireless data receiving apparatus via a plurality of antennas.

17. The method of claim 16, wherein the clipping of the amplitude clips the amplitude of each of the inverse Fourier transformed even numbered elements and odd numbered elements when the amplitude is greater than a predetermined value.

18. The method of claim 17, wherein the clipping of the amplitude clips the amplitude of each of the inverse Fourier transformed even numbered elements and odd numbered elements using the predetermined value.

19. A wireless data receiving method which receives a data stream via a wireless channel, the method comprising:
 receiving, using an antenna, a first data stream in a time domain which is orthogonal-coded;
 performing a Fourier transform of the first data stream and generating data in a frequency domain;
 orthogonal-decoding the generated data in the frequency domain and generating a second data stream; and
 determining whether to clip an amplitude of the first data stream based on the second data stream, compensating a distortion with respect to the clipped amplitude of the first data stream according to a result of the determining, and generating a third data stream.

20. The method of claim 19, wherein the generating of the data in the frequency domain performs a Fourier transform of the Space-Time block coded first data stream and generates the data in the frequency domain, and the generating of the second data stream Space-Time block decodes the data in the frequency domain and generates the second data stream.

21. The method of claim 19, wherein the generating of the data in the frequency domain performs a Fourier transform of even numbered elements and odd numbered elements of the Space-Frequency block coded first data stream and generates the data in the frequency domain, and the generating of the second data stream Space-Frequency block decodes the data in the frequency domain and generates the second data stream.

22. The method of claim 19, wherein the compensating of the distortion comprises:
 compensating a wireless channel distortion and amplitude clipping distortion of the second data stream in the frequency domain and generating a first equalization signal;
 determining a transmission symbol in the frequency domain through a hard decision of the first equalization signal; and
 determining whether to clip the amplitude of the first data stream based on an amplitude of the determined transmission symbol in the frequency domain.

23. The method of claim 22, wherein the generating of the first equalization signal determines an equalization coefficient based on a state of the wireless channel, and a ratio between an amplitude of the signal before the amplitude of the first data stream is clipped and an amplitude of a signal after the amplitude of the first data stream is clipped.

24. The method of claim 23, wherein the generating of the first equalization signal determines an equalization coefficient based on an attenuation ratio of transmission signal due to the amplitude clipping.

25. The method of claim 22, wherein the compensating of the distortion further comprises:

performing an inverse Fourier transform of the transmission symbol in the frequency domain and generating a transmission symbol in a time domain, and the determining of whether to clip the amplitude determines that the amplitude of the first data stream is clipped when an amplitude of the transmission symbol in the time domain is greater than a predetermined value.

26. The method of claim 25, wherein the generating of the transmission symbol performs an inverse Fourier transform of even numbered elements and odd numbered elements of the transmission symbol in the frequency domain, respectively, and generates the transmission symbol in the time domain.

27. The method of claim 25, wherein the compensating of the distortion further comprises:

compensating a wireless channel distortion of the second data stream in the frequency domain and generating a second equalization signal in the frequency domain;

performing an inverse Fourier transform of the second equalization signal in the frequency domain and generating a second equalization signal in the time domain; and generating a third data stream in which the distortion is due to the clipped amplitude of the first data stream, in the time domain, based on the amplitude of the transmission symbol in the time domain and a phase of the second equalization signal in the time domain.

28. The method of claim 27, wherein the generating of the second equalization signal performs an inverse Fourier transform of even numbered elements and odd numbered elements of the second equalization signal in the frequency domain, respectively, and generates the second equalization signal in the time domain.

29. The method of claim 27, wherein the generating of the second equalization signal determines the equalization coefficient based on the state of the wireless channel and a power of a signal before the amplitude is clipped.

30. The method of claim 29, wherein the compensating of the distortion further comprises:

performing a Fourier transform of the third data stream in the time domain and generating a third data stream in the frequency domain, and the determining of the transmission symbol determines the transmission symbol in the frequency domain through the hard decision of the third data stream in the frequency domain.

31. A non-transitory computer-readable recording medium storing a program for implementing a wireless data transmission method which transmits a data stream via a plurality of antennas, the method comprising:

performing an inverse Fourier transform of even numbered elements and odd numbered elements of the data stream, respectively;

clipping an amplitude of each of the inverse Fourier transformed even numbered elements and odd numbered elements; and Space-Frequency block coding the amplitude-clipped even numbered elements and odd numbered elements and generating a plurality of data streams, the plurality of data streams being orthogonal to each other.

32. A non-transitory computer-readable recording medium storing a program for implementing a wireless data receiving method which receives a data stream via a wireless channel, the method comprising:

performing a Fourier transform of a first data stream and generating data in a frequency domain;

orthogonal-decoding the generated data in the frequency domain and generating a second data stream; and determining whether to clip an amplitude of the first data stream based on the second data stream, compensating a distortion with respect to the clipped amplitude of the first data stream according to a result of the determining, and generating a third data stream.

* * * * *